United States Patent [19]

Hunkar

[11] 3,860,801
[45] Jan. 14, 1975

[54] INJECTION MOLDING CONTROL

[76] Inventor: Denes B. Hunkar, 2530 Vera View Dr., Cincinnati, Ohio 45244

[22] Filed: June 19, 1973

[21] Appl. No.: 371,390

[52] U.S. Cl............ 235/151.1, 235/150.1, 425/144, 425/145, 425/149
[51] Int. Cl. ............................. G06g 7/66, B29f 1/06
[58] Field of Search .......................... 235/151, 151.1; 425/140-149; 264/40, 329

[56] References Cited
UNITED STATES PATENTS

| 3,628,901 | 12/1971 | Paulson .............................. 425/149 |
| 3,642,402 | 2/1972 | Hutchinson et al................. 425/144 |
| 3,726,334 | 4/1973 | Sallberg ............................. 425/145 |
| 3,741,700 | 6/1973 | Hutchinson et al................. 425/149 |
| 3,767,339 | 10/1973 | Hunkar .............................. 425/149 |

Primary Examiner—Felix D. Gruber
Attorney, Agent, or Firm—Wood, Herron & Evans

[57] ABSTRACT

An injection molding control to promote uniformity in the mass of the injection charge from cycle to cycle. An injection ram is reciprocated between a fixed forward, or cushion, point coincident with the end of charge injection, and an adjustable rearward, or retraction, point correlated to size of the next charge. The retraction point is corrected at the conclusion of each injection cycle in response to comparing a reference pressure, which is correlated to the mold cavity pressure existing at the conclusion of injecting a charge of the desired mass into the molding cavity, with the pressure of the plasticized material upstream of the orifice through which the material is injected into the mold cavity. The material pressure upstream of the orifice is sampled for comparison against the reference pressure at a point in time following injection when the ram has a predetermined velocity, preferably when it has come to rest, and the injected material in the region of the orifice has not yet solidified, whereby the sampled melt pressure is correlated to the cavity pressure at the conclusion of injection and hence to the mass of the injection charge. Depending upon whether the sampled melt pressure upstream of the orifice is above or below the reference pressure, the retraction point is shifted closer to, or further from, the orifice, respectively, to shorten or extend, respectively, the distance over which plasticized material for the next charge is accumulated forward of the ram tip.

15 Claims, 3 Drawing Figures

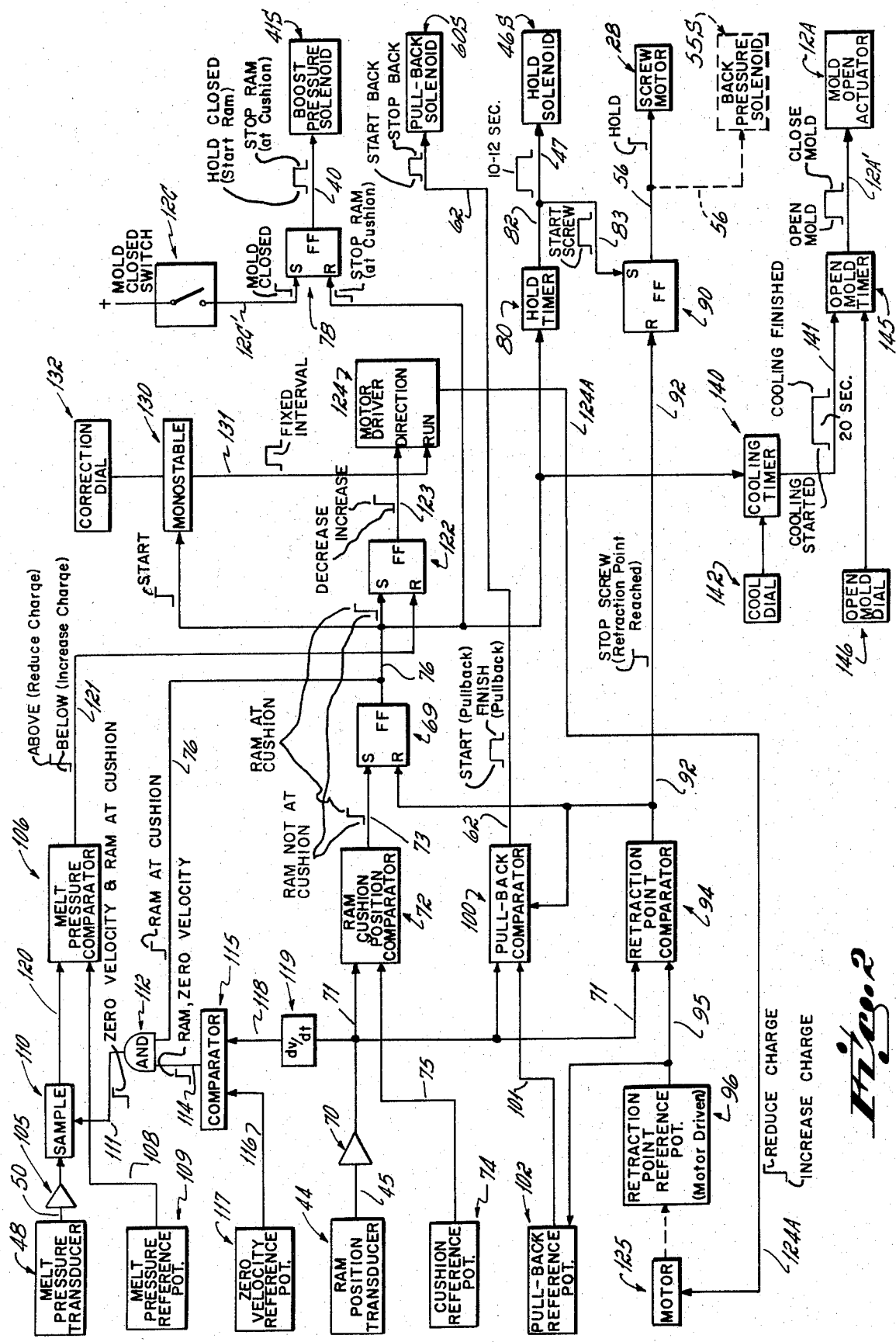

INJECTION MOLDING CONTROL

This invention relates to controls for injection molding machines, and more particularly to controls for promoting uniformity in the mass of the charge of plasticized material injected into the molding cavity during successive molding cycles.

In the field of injection molding, injection equipment is employed which cyclically supply a specified quantity, usually called a "charge," of plasticized material to a mold. These machines are typically of the reciprocating screw type in which the material to be molded is fed into a barrel housing a screw where it is plasticized through the mechanical working of the material by rotation of the screw. As the material is worked in the chamber by the rotating screw, plasticized material accumulates in the chamber forward of the screw tip. This accumulation of material forces the screw to retract, that is, to move rearwardly in a direction away from an injection orifice communicating with the mold cavity which is located at the forward end of the barrel. It is through the orifice in the forward end of the barrel that the accumulated material is eventually injected into the molding cavity by advancement of the screw in the ensuing injection cycle. When enough plasticized material has been accumulated forward of the screw tip, which is measurable by monitoring the extent to which the screw has retracted away from the cavity orifice, screw rotation terminates, and the screw is advanced toward the orifice of an injection stroke to force the accumulated charge of plasticized material through the orifice into the molding cavity.

In injection molding apparatus of the type described, it is desirable, and where high quality is required it is essential, that the amount of plasticized material, or charge, injected into the mold cavity each cycle be maintained at a constant value. If this is done, the mass of the molded parts will vary and, assuming constant material density, the variation in charge mass will produce corresponding variations in size, with the result that molded parts are not produced to satisfactory dimensional tolerances.

As disclosed in co-pending patent application Ser. No. 194,244, filed Nov. 1, 1971 in the name of Denes B. Hunkar now U.S. Pat. No. 3,767,339, which is assigned to the assignee of this application, there is a relationship between the pressure within the mold cavity during the injection cycle and the charge size, i.e., the mass of material injected into the cavity. Furthermore, this "cavity pressure" can be used as a parameter to control charge size. For example, when cavity pressure reaches, during injection, a predetermined value associated with a charge of predetermined mass, or weight, the injection cycle can be terminated. In this manner, uniform charges of predetermined mass are repeatedly obtained from cycle to cycle. In accordance with a preferred form of the apparatus disclosed and claimed in the foregoing Hunkar application, cavity pressure is monitored by a pressure transducer which directly communicates with the interior of the molding cavity. While such direct measurement of the cavity pressure by a transducer actually located within the mold cavity is preferred in most molding applications, there does occur in practice certain situations where placement of a transducer in the mold cavity is undesirable, and in certain cases impossible.

For example, in certain molding applications, surface finish requirements are so high that the surface discontinuity produced as a result of placement of the transducer in the molding cavity cannot be tolerated. Illustrative of such a situation is the molding of high quality optical components. In addition to the functional need in certain types of components for flawless surface finish, in certain instances customers impose such a requirement for aesthetic reasons alone, irrespective of the actual need therefor.

It has also been found, in certain other applications, it is physically impossible to locate a pressure transducer in direct communication with the molding cavity for reasons inherent in either the design or operation of the mold. For example, some molds are designed such that their molding cavities are completely surrounded by conduits through which coolant is circulated to control cooling of the molded part. In such a case, it is physically impossible to locate a pressure transducer in the mold such that it will be in direct communication with the molding cavity.

In other cases, particularly where thermosetting plastic materials are utilized, the operating temperature of the mold is so high that transducers cannot be placed in direct communication with the mold cavity without unduly high failure rates. While the cost of transducer failure may not be prohibitive if consideration is given only to the replacement cost of the transducer, in reality the cost is prohibitive since each time a transducer fails and must be replaced, the entire injection molding machine must be shut down, disassembled, the transducer replaced, and the machine reassembled. Obviously, "downtime" to replace a transducer becomes expensive when the machine which is "down" represents an investment of between $50,000 and $250,000.

Accordingly, it has been an objective of this invention to provide an injection molding control for promoting uniformity in the mass, or weight, of the injection charge which permits high quality molded parts to be produced with flawless surface finish, can be used irrespective of the physical configuration of the mold including molds completely surrounded by coolant conduits, and is operative without undesirable pressure transducer failure even when occasioned by extremely high operating temperatures. This objective has been accomplished in accordance with certain of the principles of this invention by incorporating, in an injection mold of the type wherein cavity pressure is used as the control parameter for the charging operation, a pressure transducer located to be responsive to the plasticized material, but exteriorly of the mold cavity such as in the injector barrel, and means to sample the output of the pressure transducer when the injection ram has a predetermined velocity, preferably when the ram has completed its stroke and come to rest, but prior to solidification of the injected material in the cavity orifice. By locating the transducer exteriorly of the mold cavity, the surface finish of the molded article is not marred as would be the case were the transducer placed in the cavity itself. Additionally, injection charge control by pressure measurement techniques, such as described in the foregoing Hunkar application and proven to be a reliable approach, is possible in situations heretofore impractical and/or impossible, such as where mold design prevents placement of a transducer in the cavity and/or the temperature of the molding material is so high that repeated transducer failures ordinarily occur.

By virtue of sampling of the pressure transducer output when the injection ram has a predetermined velocity, preferably when it has come to rest, but prior to solidification of the plasticized material in the cavity orifice, as is done in this invention, a pressure measurement from a point exteriorly of the molding cavity is obtained which is reliably correlated to the cavity pressure at the conclusion of the injection cycle and hence to the weight of the injected material. If the ram has not come to rest or otherwise not arrived at a predetermined velocity when the pressure transducer output is sampled, the pressure reading will be erroneous by virtue of the fact that the plasticized material has some undetermined motion, and as such adds a dynamic pressure component of undetermined amount to the sampled pressure reading when in reality it is static pressure which is desired as the measure of cavity charge, or at least the sum of the static pressure and a dynamic pressure component of constant value associated with a ram velocity of predetermined amount. While pressure sampling when the ram has a predetermined velocity, adds a dynamic pressure component to the pressure measurement, such is acceptable because the dynamic pressure component is constant from sample to sample, all samples having been taken at the same ram velocity.

If the transducer output is not sampled prior to solidification of plasticized material in the cavity orifice, the cavity becomes sealed-off with respect to the injection barrel with the result tht the sampled pressure reading bears no meaningful relation to the pressure within the cavity and hence to the size of the cavity charge. Thus, it is essential that the pressure transducer, which is located externally of the cavity, in addition to being monitored under conditions of predetermined ram velocity, preferably when the ram is at rest, must also be monitored under conditions of no orifice blockage, if the resultant pressure measurement is to be properly correlated to cavity pressure and hence to charge mass.

A further advantage of this invention, wherein the pressure transducer is located externally of the mold cavity, is A reduction in cost of the mold design itself. Heretofore, in designing a mold which was to have a pressure transducer located in it, it was necessary to undertake a specific design study to determine the optimum location for the pressure transducer, and as the configuration of the mold changed so did the location of the pressure transducer. This mold-by-mold selection of transducer location is unnecessarily time-consuming and costly from a design standpoint. Whereas, with the apparatus of this invention, the pressure transducer is located exteriorly of the mold, such as in the injection barrel, and does not change from mold to mold. Thus, once a location is selected for placement of the transducer in the injection barrel, further design time in determining transducer placement as molds are changed is not required, resulting in considerable design cost savings.

In accordance with a peferred embodiment of this invention, the length of the injection ram stroke, which is correlated to the weight of the injection charge, is varied in accordance with the sampled injection barrel pressure between a fixed forward, or cushion, point and a variable rearward, or retraction, point. Adjustment of the retraction point, following sampling of barrel pressure when the ram has reached the cushion point, is accomplished with a closed loop feed-back system. The feed-back system compares the sampled barrel pressure against a reference pressure correlated to the desired cavity charge and in response to difference existing therebetween generates an error signal for adjusting the retraction point, and hence the mass of the charge for the next cycle, in a direction and amount designed to reduce the disparity between the sampled and reference pressure. Such an arrangement is relatively simply and inexpensively implemented, thereby adding to the utility of the invention.

These and other advantages and objectives of the invention will become more readily apparent from a detailed description of the invention taken in connection with the drawings in which:

FIG. 2 is a schematic circuit, in block diagram format, of a control circuit incorporating the principles of this invention for controlling the injection molding apparatus depicted in FIG. 1.

Figure 1:
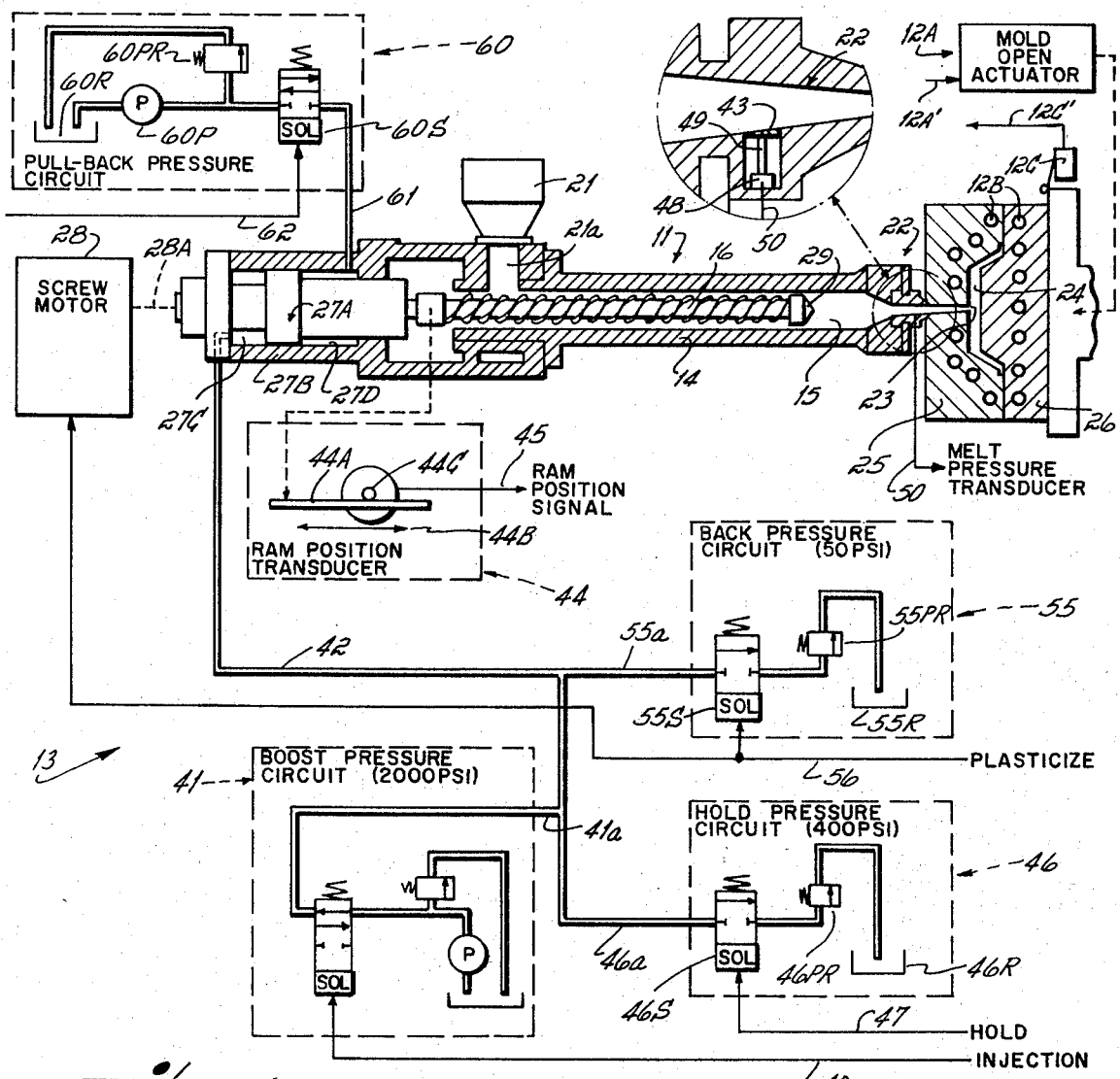
FIG. 1 is a diagrammatic illustration of injection molding apparatus utilizing a control system which incorporates the principles of this invention.

Conventional injection molding apparatus modified to incorporate the controls of this invention is shown in FIG. 1. With reference to FIG. 1, the injection molding apparatus, which in a preferred form is of the reciprocating screw type, includes an extrusion or injection apparatus 11, mold assembly 12, and an electrically controlled hydraulic circuit 13. The injection apparatus 11 includes an injection cylinder or housing 14 which is generally elongated in shape and provided with an interior cylindrical plasticizing or melt chamber or barrel 15. Axially disposed within the melt chamber 15 is a screw or ram 16 which is both rotatable about its axis as well as axially translatable within the barrel or chamber 15.

The upstream end of the melt chamber 15 communicates with an input hopper 21 via a passage 21a connected to the lower end of the hopper. Molding material, typically in the form of pelletized thermoplastic or thermosetting composition, is loaded into the open upper end of the hopper 21 where it is gravity-fed via passage 21a into the rearward or upstream end of the melt chamber 15 atop the rear end of screw 16. The downstream end of the melt chamber or barrel 15 terminates in an injection nozzle 22 which at its downstream end communicates with a mold cavity 24 via an orifice 23.

The mold cavity 24 of the mold assembly 12 is established or defined by a pair of mold elements 25 and 26 which are relatively movable toward and away from each other by a mold opening actuator 12A to allow molding of an object in cavity 24 and the subsequent removal thereof. A suitable limit switch 12C is provided to sense when the mold elements 25 and 26 are in the closed position and to provide an appropriate control signal on output line 12C' thereof to reflect this condition. Additionally, suitable conduits 12B are preferably provided in the mold elements 25 and 26 to facilitate the circulation of coolant to permit rapid and controlled cooling of the molded article.

The screw or ram 16 is selectively bi-directionally axially movable within the barrel 14 by a hydraulic piston 27A fixedly secured thereto which is slidably movable in a cylinder 27B. Cylinder 27B is divided into two variable size cylinder sections 27C and 27D by the movable piston head 27A. Rotation of the screw or ram 16 is obtained by a motor 28 which has a rotatable output shaft 28A drivingly connected to the piston 27A.

In normal operation, the injection molding apparatus repeatedly cycles through a predetermined molding sequence. Each sequence may be considered to begin upon ejection of a molded article from the cavity 24. Specifically, following a suitable cooling period initiated after plasticized material has been injected by the ram 16 into the mold cavity 24 through orifice 23, the mold actuator 12A is operated by a control signal on its input line 12A' to separate the mold elements 25 and 26 and eject the molded article from cavity 24. The mold elements 25 and 26 remain open for a period of time established by a suitable open mold timer to be described, whereupon the mold actuator 12A returns the molding elements to their closed position shown in FIG. 1, tripping limit switch 12C which provides a control signal on its output line 12C', reflecting the fact that the mold cavity 24 is now closed. Following closure of the mold cavity 24, an injection command on line 40 is provided to a boost pressure circuit 41 by a control circuit to be described which, in a manner also to be described, causes hydraulic pressure on the order of 2,000 psi to be input to one end 27C of the hydraulic cylinder 27B via hydraulic lines 41A and 42. This urges the ram 16, which has previously accumulated a predetermined charge of plasticizing material in the melt chamber 15 downstream of the ram tip 29, rightwardly as viewed in FIG. 1. Rightward movement of the ram 16, particularly the tip 29, causes the accumuated charge of plasticized material for the next mold cycle to be injected into the cavity 24 via the nozzle 22 and ultimately the orifice 23.

Rightward injection motion of the ram 16 under the action of hydraulic booster circuit 41 continues until the ram tip 29 reaches a predetermined point in the barrel or melt chamber 15, known as the "cushion point." When the ram tip 29 reaches the cushion point, a signal is provided by means to be described later, which include a position transducer or sensor 44 connected to the ram which provides on its output 45 an analog signal correlated in magnitude to the ram position. The signal provided when the ram tip 29 reaches the cushion point causes the 2,000 psi boost pressure provided by hydraulic circuit 41 to terminate, and instead a holding pressure to be substituted of approximately 400 psi provided by a hold circuit 46. Holding pressure circuit 46 has its output line 46A connected to the hydraulic cylinder chamber 27C via the line 42, and is under the control of an electric signal provided on input line 47. The holding pressure applied to the ram 16 from hold circuit 46 continues for the duration of a holding interval, for example, 10–12 seconds, established by a hold timer to be described.

The trigger signal developed when the ram tip 29 reaches the cushion point during the injection phase of an operational cycle, in addition to terminating the boost pressure and initiating the hold pressure also performs certain additional functions. Briefly, it starts the hold timer having the 10–12 second timing period, as noted, and a cooling timer having a 20–25 second timing period which upon expiration causes the mold elements 25 and 26 to separate.

The trigger signal coincident with the ram reaching the cushion point further operates to cause the pressure of the plasticized melt material in the nozzle 22 to be sampled when the ram 16 and hence the molten material in the barrel nozzle 22 have a predetermined velocity, namely, when they have come to rest. To facilitate monitoring the pressure of the molten material in the barrel nozzle 22, a pressure transducer or sensor 48 is provided which communicates with the nozzle interior via an incompressible pin 49 axially slidable in a bore in the nozzle wall which transmits the pressure of the melt material in the nozzle to pressure transducer 48. A pressure transducer found suitable is manufactured by Sensotec Inc., Columbus, Ohio, designated model MPT. An appropriate flexible membrane 43 seals the nozzle 22 with respect to the bore in the nozzle wall housing pin 49 and transducer 48. For high temperature use pin 49 may be fabricated of titanium or other suitable high melting point metal. An output line 50 provides a continuous analog electrical signal of the pressure of the melt material in the barrel nozzle 22. If the sampled melt pressure following an injection cycle is higher than a predetermined reference value corresponding to injection of a predetermined and desired charge of plasticized melt material, a correction signal is developed to decrease the amount by which the ram retracts, and hence to decrease the mass of the succeeding charge. If the sampled barrel pressure is too low indicating less than the desired charge, a correction signal is provided which increases the amount by which the ram retracts and in turn increases the succeeding charge.

When the hold timer times out, the hold pressure supplied by circuit 46 terminates and is replaced by a back pressure of approximately 50 psi supplied by back pressure hydraulic circuit 55 whose output 55A connects to the hydraulic cylinder chamber 27C via line 42. Back pressure circuit 55 is under the control of a signal provided on input line 56. The signal input on line 56 is also input to the ram motor 28 which initiates rotation of the ram 16. The ram 16 is rotated in a direction which causes the screw threads thereof to feed material toward the orifice 23 and to accumulate material downstream of the tip 29 of the ram 16. This action, together with heat which is applied to the wall of the cylinder 14 by means not shown, causes the material to plasticize within the barrel or chamber 15. This feeding and charge accumulation action builds up pressure in the chamber 15 which eventually overcomes the back pressure exerted on the ram piston 27A by the back pressure circuit 55, causing the ram to retract away from the nozzle 22 until it reaches a full retracted position at the upstream end of the chamber 15. The ram retraction point was adjusted as a consequence of the preceding injection cycle as a consequence of a comparison of the sampled melt pressure in barrel 15 provided by pressure transducer 48 on line 50 against a reference pressure correlated to the pressure which exists when the desired amount of material has been injected into the cavity 24. Upon reaching the corrected retraction position, which position is in part determined by the output of the position transducer 44 on line 45, the back pressure provided by hydraulic circuit 55 terminates as does the rotation of the screw by motor 28. Instead, ram pull-back pressure is applied to the hydraulic cylinder chamber 27D via hydraulic line 61 from a ram pull-back circuit 60 which is under control of an electrical signal input thereto on line 62. The pull-back pressure applied to the piston 27A functions to retract the ram 16 a fixed amount which is designed to decompress the plasticized material located between the ram tip 29 and the orifice 23. Such decompression eliminates the need for providing a valve at the orifice 23 since the plasticized material accumulated between the orifice and the ram tip 29, once decompressed by retraction of the ram under the action of pull-back circuit 60, will not flow into the cavity 24 via orifice 23. Such flow is prevented from occurring while the charge is accumulating and prior to termination of screw rotation and retraction under the action of pull-back circuit 60, by reason of the fact that the material in the orifice 23 from the preceding injection cycle has solidified almost immediately following injection. With the material in the orifice 23 solidified shortly after completion of injection of the charge into cavity 24, the cavity 24 is effectively sealed with respect to the melt chamber 15 including the nozzle 22.

When the ram 16 has reached the "pull-back" position following termination of screw rotation, the apparatus goes into a standby mode until the cooling timer has completed its timing interval during which time the injected material in the mold 24 is cooling and the molded article completes its solidification. Upon expiration of the cooling time interval, the mold open actuator 12A is signalled via its input line 12A' which is effective to separate the mold members 25 and 26 and eject the molded article from cavity 24. The mold members 25 and 26 remain open for a predetermined time established by a mold open timer, whereupon the mold open actuator 12A is deactuated and the mold members 25 and 26 moved together to close cavity 24 and actuate limit switch 12C which provides on its output line 12C' a signal which starts another complete cycle.

The booster pressure circuit 41 which drives the ram 16 inwardly to charge the cavity 24, the hold pressure control circuit 46 which applies a holding pressure to the ram 16 following injection, and the back pressure circuit 55 which urges the ram rightwardly while the screw is driven by motor 28, and the pull-back circuit 60 which retracts the ram 16 to decompress the charge accumulated forward of ram tip 29, can be constructed in accordance with the known hydraulic design principles.

The booster pressure circuit 41 preferably consists of a pump 41P having its inlet end connected to a hydraulic fluid reservoir 41R and its outlet end connected to line 41A. The pressure in line 41A developed by pump 41P of boost pressure circuit 41 is maintained at the desired boost pressure value of approximately 2,000 psi by a solenoid valve 41S which connects line 41A to the hydraulic fluid reservoir 41R via a pressure relief valve 41PR set for 2,000 psi. When the solenoid valve 41S is in the open position, the pressurer in line 41A developed by the pump 41P cannot exceed the pressure setting of the relief valve 41PR. The solenoid valve 41S of boost pressure circuit 41 is controlled by an electrical signal input on line 40.

The holding pressure circuit 46 preferably includes a solenoid valve 46S which selectively connects hydraulic line 46A to a hydraulic fluid reservoir 46R via a pressure relief valve 46PR set for the desired holding pressure of approximately 400 psi. During the injection cycle when the ram 16 is subjected to 2,000 psi output from booster pressure line 41A, the solenoid valve 46S is closed. However, upon receipt of a holding pressure command on line 47, the solenoid valve 46S of hold circuit 46 is placed in its open condition to connect line 46A at the boost pressure of 2,000 psi to the reservoir 46R via the pressure relief valve 46PR of the hold circuit. Since this pressure relief valve is set for approximately 400 psi, fluid will be bled from line 46A to the reservoir 46R via the open solenoid 46S and pressure relief valve 46PR of hold circuit 46 until the pressure in line 46A drops to the holding pressure of 400 psi set in holding circuit pressure relief valve 46PR, whereupon the holding pressure solenoid valve 46S closes.

The back pressure hydraulic circuit 55 includes a solenoid valve 55S which connects output line 55A to a reservoir 55R via a pressure relief valve 55PR set to the desired back pressure of approximately 50 psi. When a plasticize command signal is input to solenoid valve 55S of back pressure circuit 55 via electrical input line 56, the solenoid valve is placed in its open position to connect line 55A previously subject to the holding pressure of 400 psi to the reservoir 55R via the back pressure relief valve 55PR set for approximately 50 psi. Hydraulic fluid is drained from line 55A to the back pressure hydraulic reservoir 55R until the pressure in line 55A reaches the desired back pressure value of approximately 50 psi.

The pull-back ram hydraulic circuit 60 includes a pump 60P having its input line connected to a fluid reservoir 60R and its output line connected to a solenoid valve 60S via a pressure relief valve 60PR set at the desired pull-back pressure. In operation, when a pull-back command signal is input to the pull-back circuit 60 on line 62, fluid pressurized to the setting of the pull-back pressure relief valve 60PR is input to the cylinder 27D via line 61. The setting of pull-back pressure relief valve 60PR should exceed the setting of the back pressure relief valve 55PR so that a net force on the piston 27A will result in a direction to retract the ram. Obviously, other hydraulic circuits can be provided to provide the desired booster pressure, holding pressure, back pressure, and pull-back pressure, the descriptions provided being only for purposes of illustration.

Considering the control circuit of this invention in more detail, the ram position transducer 44 provides on its output line 45 an analog signal having a magnitude correlated to the axial position of the ram within the barrel or cylinder 14. The ram position transducer 44 may, for example, include a rack 44A which is connected to translate bidirectionally in the direction of arrow 44B in proportion to the bidirectional translation in an axial direction of the ram 14, and a pinion 44C which drives a movable wiping contact relative to a voltage divider to provide on output line 45 an analog voltage proportional in magnitude to the position of the screw 16 in the barrel 14. The position-correlated signal from the ram position transducer 44 on output line 45, following suitable amplification in an amplifier 70, is fed to a ram cushion position comparator 72 where the position of the ram as reflected by the output signal from amplifier 70 on line 71 is continuously compared against the preselected and fixed forward position or cushion point of the ram as established by a cushion point reference potentiometer 74 which provides on output line 75 an analog voltage correlated in magnitude to the magnitude of the cushion point. When the amplified ram position transducer output on line 71 is equal to the cushion point reference potential on line 75, a logical "1" output is provided by the ram cushion position comparator 72 on output line 73 indicating that the ram tip 29 has reached the desired forward limit of travel termed herein the "cushion point." The logical 1 output on line 73 produced coincidentally with the ram tip 29 reaching the preselected cushion point is input to the set terminal of a first flip-flop 69, setting this flip-flop which in turn provides on its output line 76 a logical 1 signal. The logical 1 output on flip-flop line 76 produced coincidentally with the ram tip 29 reaching the cushion point is fed to the reset terminal of a third flip-flop 78, resetting this flip-flop to return its output on line 40 to a logical 0 to close booster pressure solenoid 41S and terminate the application of booster pressure to the ram piston 27A coincident with arrival of the ram tip 29 at the cushion point, the flip-flop 78 was in the set condition, having been set upon closure of mold cavity 24 by movement of mold element 26 toward mold element 25 which tripped limit switch 12C producing on output line 12C' a logical 1 signal to set the flip-flop 78 and provide a logical 1 output on line 40 to the booster pressure solenoid 41S which as previously noted initiates the injection of plasticized material into the mold cavity 24.

The logical 1 signal output from flip-flop 69 on line 76 produced coincidentally with arrival of the ram tip 29 at the cushion point which, as just described, effectively terminates the application of booster pressure to the ram, is also input to the hold timer 80. Hold timer 80 which may take the form of a monostable multivibrator, provides on its output line 82 a logical 1 signal for approximately 10–12 seconds. This signal is input via line 47 to hold solenoid 46S to cause hold circuit 46 to apply for 10–12 seconds the 400 psi hold pressure to the ram 16 which has just reached the cushion point.

The 10–12 second duration hold signal on line 82 from the hold timer 80 is also input via line 83 to the set terminal of a flip-flop 90 causing this flip-flop to produce on its output line 56 a logical 1 signal which is input to the screw motor 28 to energize this motor and initiate rotation of the screw and which is input to the back pressure solenoid 55S to cause the 50 psi back pressure to be applied by the hydraulic circuit 55 to the ram 16. The flip-flop 90 remains in the set condition, energizing the screw motor 28 and the back pressure solenoid 55S unti it is reset by a logical 1 input signal to its reset terminal which will appear on line 92 when the ram reaches the retracted position in a manner to be described later.

The screw motor 28 and back pressure solenoid 55S remain energized and the size of the charge of plasticized material accumulated between the ram tip 29 and the orifice 23 continues to increase until a logical 1 signal is input to flip-flop 90 on line 92 whereupon, and as indicated, the flip-flop 90 will be reset changing its output on line 56 to a logical 0 and in turn de-energizing the screw motor 28 and the back pressure solenoid 55S. The signal on line 92 for resetting flip-flop 90 and de-energizing the screw motor 28 and back pressure solenoid 55S is produced by a retraction point comparator 94. Comparator 94 has one input connected to the amplified ram position signal on line 71 and the other input connected to the output line 95 of a retraction point reference potentiometer 96. As noted, the signal on line 71 is an analog signal having a magnitude correlated to the axial position of the ram in the barrel 14. When the axial position of the ram in the barrel as reflected by the signal level on line 71 equals the desired retraction point as reflected by the reference potential provided on line 95, a logical 1 output is provided on line 92 from retraction comparator which, as noted, is input to flip-flop 90 to reset this flip-flop and in turn return the output on line 56 to a logical 0 which de-energizes screw motor 28 and the back pressure solenoid 55S terminating rotation of the screw and the application of back pressure to the ram.

The logical 1 signal on line 92 from the retraction point comparator 94 indicating that the desired charge has been accumulated forward of the ram tip 29 as manifested by retraction of the ram to the retraction point established by retraction reference potentiometer 96 is also input to a pull-back comparator 100. Pull-back comparator 100 has two inputs, one of which is the amplified ram position transducer output on line 71. The other input to the pull-back comparator 100 is provided on line 101 from a pull-back reference potentiometer 102. The pull-back reference potentiometer 102 provides on its output line 101 a reference potential whose magnitude is correlated to the point at which it is desired to have the pull-back circuit 60 retract the ram beyond the retraction point established by potentiometer 96 for the purpose of decompressing the charge accumulated forward of the ram tip 29 while the ram screw was turning and the back pressure applied. For example, the desired amount of "pull-back" of the ram beyond the retraction point established by reference potentiometer 96 may be one-half inch. However, since the retraction point established by the retraction reference potentiometer 96 will be varying in a manner dependent upon the sampled nozzle pressure and hence the size of the previous injection charge, in a manner to be described, the reference potential on line 101 will be varying from cycle to cycle. The reference potential on line 101 will follow the reference potential on line 95, from cycle to cycle, but will always exceed the reference potential on line 95 by a fixed amount dependent upon the amount it is desired to "pull-back" the ram beyond the point established by reference potentiometer 96 which corresponds to the point of ram retraction where the screw motor 28 and back pressure solenoid are de-energized.

When the ram reaches retraction point established by reference potentiometer 96, a logical 1 signal is produced on line 92 which, among other things, is input to the pull-back comparator 100. This input to the pull-back comparator 100 is effective to provide a logical 1 output on line 62 to the pull-back solenoid 60S closing the pull-back circuit 60 to apply hydraulic pressure to cylinder chamber 27D via line 61 to further retract the ram. This logical 1 signal input to the pull-back solenoid 60S on line 62, which commenced with the ram reaching the retraction point set by reference potentiometer 96, produced by an output from retraction point comparator 94 on line 92, continues until the signals on line 71 and 101 are equal indicating that the ram has reached a position coincident with the desired pull-back position for the ram cycle in question. When the inputs to the pull-back comparator 100 are equal, the output from the comparator 100 returns to a logical 0 indicating that "pull-back" of the ram is complete.

This in turn de-energizes the ram solenoid 60S causing no further pull-back motion of the ram.

As noted earlier, the point at which the screw motor 28 is de-energized, termed the "retraction point," determines the amount of material accumulated forward of the ram tip 29 and hence the size of the charge injected into the cavity 24 when boost pressure is applied by circuit 41 to the ram upon closure of mold sensing switch 12C following ejection of a molded article. Also as noted, the retraction point for any given ram cycle is determined by the retraction point reference potentiometer 96 which provides on output line 95 a voltage correlated in magnitude to the desired retraction point. In accordance with this invention, the retraction point and, hence, the reference potential provided on line 95 from the retraction point reference potentiometer 96, is corrected at the end of each injection cycle in a manner dependent upon the size of the charge injected during that cycle. As described in the copending Hunkar patent application, the size of the charge injected into mold cavity 24 is correlated to the cavity pressure upon the completion of the injection phase of the operating cycle. in accordance with a preferred embodiment disclosed in the above-described Hunkar patent application, the cavity pressure at the end of the injection phase of the operating cycle is measured directly by means of a transducer communicating directly with the molding cavity. In certain molding applications, discussed previously, direct measurement of the cavity pressure is not feasible. Accordingly, in accordance with this invention, molding cavity pressure at the conclusion of the injection phase of the operating cycle is still used as an indicia of the mass of the injection charge, but such cavity pressure is not measured directly but rather indirectly.

Specifically, the pressure of the plasticized melt in the nozzle 22 is sampled following the injection phase of the operating cycle when the ram has reached the cushion point and has a predetermined velocity, preferably, when it has come to rest, and the melt material in the nozzle has a predetermined, preferably zero, velocity, and prior to the time that the injected material in the orifice 23 has had a chance to solidify. by the barrel nozzle pressure when the plasticized material in the barrel nozzle 22 is at some predetermined, preferably zero, velocity and solidication has not yet occurred at the orifice 23 to seal off the cavity 24 from the barrel nozzle, the pressure measurement in the barrel nozzle closely follows the pressure in the cavity and, hence, barrel nozzle pressure measured under the foregoing conditions is an accurate indication of the mass of material injected into the cavity. If the sampled barrel nozzle pressure following the injection phase of an operating cycle is too high, the charge of injected material is too large and accordingly in the succeeding cycle it is reduced by adjusting the retraction point reference potentiometer such that the retraction point reference voltage on line 95 is lower, causing the screw motor 28 to de-energize at a point closer to the cushion point than in the preceding cycle. Similarly, if the sampled barrel nozzle pressure is too low, indicating that the injected charge of material is insufficient, the charge during the succeeding cycle is increased by adjusting the retraction point reference potentiometer such that the reference potential on line 95 is increased with the result that the screw motor 28 is de-energized at a point further from the cushion point than was the case in the preceding cycle.

Sampling of the nozzle pressure following the injection phase of an operating cycle is achieved by gating, when the ram has reached the cushion point and in the preferred embodiment has come to rest, the output of the pressure transducer 48 on line 50 following amplification in an amplifier 105 to a melt pressure comparator 106 which is also responsive to a melt pressure reference signal on line 108 from a melt pressure reference potentiometer 109. This gating is accomplished by a sample circuit 110 which is strobed on line 111 from an And-Gate 112 upon coincidence of logical 1 signals at the inputs thereto which occurs when the ram has reached the cushion point as manifested by the presence of a logical 1 on line 76 and ram velocity has been reduced to the predetermined, preferably zero, level, producing a logical 1 on line 114 output from a comparator 115 which compares a zero velocity reference potential on line 116 from a zero velocity reference potentiometer 117 with the output on line 118 of a differentiator 119 which takes the derivative of the ram position transducer output, as amplified, on line 71 and differentiates it to produce on line 118 a ram velocity signal. Thus, when the ram has reached the cushion point and has also reached a predetermined velocity, preferably when it comes to rest, an output from Andgate 112 is provided to sample circuit 110 for sampling the output of the melt pressure transducer 48 whereupon it is compared with the output of the melt pressure reference potentiometer 109 in comparator 106.

If the sampled melt pressure in the barrel nozzle 22 as manifested by the signal level on line 120 exceeds the desired melt pressure as manifested by the reference signal on line 108, which is indicative that the cavity pressure and, hence, the injection charge exceeds that which is desired, a logical 1 signal is provided on comparator output line 121. This signal resets the flip-flop 122, providing a logical 0 signal on flip-flop output line 123 to a motor driver 124 which determines the direction of rotation of a motor 125 which controls the output on line 95 of the retraction point reference potentiometer 96 in a manner such that the retraction point reference is reduced to in turn cause the retraction point, whereat the screw motor is de-energized, to be closer to the cushion point than was the case in the preceding cycle. If the sampled nozzle melt pressure is below the desired melt pressure established by melt pressure reference potentiometer 109, indicating that the last charge was less than that desired, a logical 0 is provided on line 121. A logical 0 signal on line 121 is ineffective to reset the flip-flop 122 with the result that a logical 1 signal is provided on flip-flop output line 123, causing the motor driver 124 to drive the motor 125 in a direction such that the retraction point reference potential signal on line 95 provided by the retraction point reference potentiometer 96 is increased with the result that the retraction point at which the screw motor 28 is de-energized is further from the cushion point than in the previous charging cycle. Thus, charging is increased in the succeeding cycle.

The charge is increased in any given cycle if the retraction point, i.e., the point at which the screw motor 28 is de-energized, is more distant from the cushion point than the succeeding cycle, which in turn depends upon whether the retraction point reference potential on line 95 has been increased, which in turn depends upon whether the retraction point reference potentiometer 96 has been rotated in a specified direction by the motor 125, which in turn depends upon whether the polarity of the output of motor driver 124 on line 124A is positive, which in turn is determined by the presence of a logical 1 signal on motor driver input line 123, which in turn is dependent upon whether flip-flop 122 has failed to become reset by the presence of a logical 0 output from the melt pressure comparator on line 121, which in turn depends on the sampled melt pressure signal on line 120 being below the desired melt pressure signal on line 108 established by melt pressure reference potentiometer 109. In a similar, but opposite fashion, movement of the retraction point closer to the cushion point than in the previous cycle depends upon the sampled melt pressure being above the desired melt pressure as established by the melt pressure reference potentiometer 109.

Were the sampled melt pressure in barrel nozzle 22 to exactly equal the desired melt pressure, the output of the melt pressure comparator would be at a logical 0, with the result that the flip-flop 122 remains set, this flip-flop having previously been set by the logical 1 input thereto on its set terminal produced when the ram reached the cushion position and set flip-flop 69. With the flip-flop 122 left in the set condition, a logical 1 is present on flip-flop output line 123 with the result that the injection charge is increased. By arbitrarily increasing the injection charge size if the sampled nozzle melt pressure equals the desired nozzle melt pressure, the control circuitry is simplified over that which would be required were no change in charge to result were the preceding charge at exactly the desired size. Since the sampled and the desired pressures are exactly equal only rarely, the increase in charge which occurs when they are equal and no increase is necessary occurs only rarely, with the result that only a minor error is produced by unnecessarily increasing the charge size when the sampled pressure and desired pressure are in fact equal. This error far outweighs the cost reduction occasioned by the simplification in circuitry which results.

Regardless of whether an increase or decrease in charge size is indicated as a consequence of the comparison of the sampled metl pressure signal on line 120 and the desired melt pressure on line 108, the output signal of the motor driver 124 on line 124A to the potentiometer motor 125 occurs for a predetermined time interval. This interval is established by a correction timer 130 which may take the form of a monostable multivibrator which provides on its output line 131 a pulse of a duration controlled by a dial 132, the pulse being initiated upon receipt of the logical 1 input to the timer 130 on line 76 coincident with the ram reaching the cushion position. The polarity of the signal from the motor driver 124 on line 124A which established the direction of rotation of motor 125, and hence whether the retraction point reference signal on line 95 is increased or decreased, varies from cycle to cycle depending upon whether flip-flop 122 is reset. As a result of the comparison of the nozzle melt pressure with the desired melt pressure, the interval during which the output is present on motor driver line 124A, and hence the duration the motor 125 is driven and the amount by which the reference point potential on line 95 is increased or decreased, is constant from cycle to cycle. Preferably, the size of the change of the retraction point potential per cycle produced on line 95 is selected to be less than the maximum correction expected per cycle, such that in a single operating cycle, it would not be possible to over-correct.

The output on line 76 from the flip-flop 69 produced coincidentally with the arrival of the ram at the desired cushion point is also input to a cooling timer 140 to initiate a logical 1 cooling signal on its output line 141 having a duration, e.g., 20–25 seconds, established by a cool dial 142. Following expiration of the cooling time interval, the output on cooling timer output line 141 reverts to a logical 0 which in turn triggers an open mold timer 145 causing a 10–12 second duration pulse to be produced on line 12A' which is input to the mold open actuator 12A to open the mold. When the open mold timer times out, the output on line 12A' reverts to a logical 0 de-actuating the mold open actuator 12A. The open mold timer 145 may take the form of a monostable multivibrator triggered by the trailing edge of the pulse output of the cooling timer 140 on line 141. The duration of the open mold timer can be established by an appropriate dial 146.

To operate the control of this invention, the operator must first set up the machine for a particular operation by dialing in or setting the numerous variables over which control is possible. Specifically, the operator adjusts the melt pressure reference potentiometer 109 such that on its output line 108 a reference potential will appear correlated to the desired nozzle pressure and hence cavity pressure which in turn is correlated to the mass of the charge to be injected into the cavity 24. The desired melt pressure reference signal on line 108 can then be compared against the actual melt pressure transducer output from transducer 48 to determine if an injected charge is above or below the desired level and hence whether the succeeding charge should be decreased or increased, respectively.

Additionally, it is necessary to adjust the zero velocity reference potentiometer 117 such that on its output line 116 a reference potential appears which is correlated to a ram velocity of approximately zero. This potential can then be compared with the actual ram velocity signal present on line 118 to determine when the output of the melt pressure transducer 48 should be sampled to most reliably represent the cavity pressure and hence the mass of the injected charge.

It is also essential to adjust the cushion point reference potentiometer 74 to provide on output line 75 a reference potential correlated to the cushion point, that is, the point in ram advancement where the ram is to stop further forward movement, and thereby terminate the injection of material into the cavity 24. The cushion point reference potential on line 75 is compared with the output of the ram position transducer 44 and when equal a control or suitable trigger signal is provided to terminate the booster pressure by circuit 41 and switch to a holding pressure from circuit 46.

It is also necessary to adjust the pull-back reference potentiometer 102 so that it provides at its output line 101 a reference potential correlated to the amount by which it is desired to retract the ram beyond the "retraction point" established by the reference potentiometer 96. It will be recalled that the reference potentiometer 96, which is adjusted following each ejection cycle, provides an output upon its line 95 correlated to the retraction point where the plasticizing screw motor 28 is de-energized and the size of the charge increased no further. The pull-back reference potential on line 101, like the cushion reference potential on line 75, is compared with the output of the ram position transducer to develop, when they are equal, a trigger or control signal which indicates that the desired charge has been accumulated forward of the ram tip 29 and the screw motor 28 should be de-energized.

It is also necessary to adjust the length of the pulse output provided by the monostable multivibrator timer 130 which is done via an appropriate correction dial 132. It will be recalled that the duration of the pulse output from monostable multivibrator timer 130 determines the length of time the motor 125 is driven in the course of correcting the retraction point reference potentiometer 96 following each injection cycle. The output of the monostable multivibrator timer 130 does not, however, control the direction of the correction of the retraction point reference potentiometer, that is, it does not control whether the retraction point reference potentiometer output is increased or decreased, this latter output control being effected by the flip-flop 122 in conjunction with the melt pressure comparator 106. In a manner similar to adjusting the monostable multivibrator timer 130, the cooling timer 140 and the open mold timer 145, which also preferably are monostable multivibrators, are adjusted by dials 142 and 146 to provide the desired cooling and mold open timing intervals.

An operating cycle will now be described. As a starting point, it is assumed that a molded article has just been ejected from the cavity 24 by separation of the mold elements 25 and 26 under the action of the mold open actuator 12A and that the mold has now been closed and the limit switch 12C tripped to provide a logical 1 signal on its output line 12C'. At this point the ram is in its "pull-back" position. The screw motor 28 is now de-energized, this having occurred when the amount of plasticized material forward of the ram tip 29 for the next injection charge reached the desired value, moving the ram rearwardly to the retraction point established by reference potentiometer 96. The retraction point was, of course, corrected at the end of the preceding injection cycle by comparing the nozzle pressure with the predetermined pressure correlated to the desired charge mass.

Actuation of limit switch 12C upon closure of the mold elements 25 and 26 produces a logical 1 output from the limit switch on line 12C' which is input to the set terminal of flip-flop 78. This is effective to set flip-flop 78 and produce on output line 40 to the boost pressure solenoid 41S a logical 1 signal, which results in the application, via hydraulic line 41A, of 2,000 psi boost pressure to the chamber 27C to urge the piston 27A and hence the ram 16 toward the orifice 23 to inject the material forward of the ram tip 29 into the mold cavity 24. Continued application of the boost pressure by hydraulic circuit 41 causes the charge of plasticized material forward of the ram tip 29 to continue to be injected into cavity 24 via orifice 23 until the ram tip 29 reaches the predetermined cushion point. When the ram tip arrives at the cushion point, the ram position signal from position transducer 44 will have reached a level equal to the cushion point reference potential on line 75 output from the cushion point reference potentiometer 74, with the result that the ram cushion point comparator 72 provides a logical 1 output on line 73 to set flip-flop 69 and in turn produce a logical 1 signal on flip-flop output line 76. This logical 1 output signal on flip-flop line 76 resets flip-flop 78 returning the output thereof on line 40 to a logical 0 which de-energizes boost pressure solenoid 41S to terminate the application of boost pressure by the circuit 41 to the ram.

The logical 1 output from flip-flop 69 produced coincident with the ram reaching the cushion point is input to the hold monostable multivibrator timer 80 providing on its output line 82 a 10–12 second duration logical 1 signal which is in turn input to the hold solenoid 46S of circuit 46 to cause 400 psi hold pressure to be applied to the ram via hydraulic lines 46A and 42.

The logical 1 output from flip-flop 69 produced coincident with the ram tip reaching the cushion point position is also input to And-gate 112 to effect sampling of the melt pressure transducer output from transducer 48 when the ram has reduced its velocity to approximately zero as determined by comparator 115 which compares the ram velocity signal on line 118 against a predetermined, preferably zero, velocity reference potential signal on line 116. If the sampled melt pressure signal on line 120 is, for example, above the predetermined reference melt pressure established by potentiometer 109 correlated to the desired injection mass, a logical 1 signal is provided by comparator 106 which resets flip-flop 122 causing a logical 0 signal to be input to the motor driver circuit 124 on line 23 which causes the motor 125 when energized by the monostable multivibrator 130 for a predetermined correction interval determined by correction dial setting 132 to drive in a first direction. Movement on the motor 125 in this direction for the fixed interval determined by the pulse width of the output from monostable multivibrator timer 130 causes the retraction point reference potentiometer 96 to correct in decreasing fashion the retraction point reference potential on line 95 which is input to comparator 94 for comparison against ram position signal present on line 71. With the retraction reference potentiometer 96 readjusted, the reference potential on output line 95 to comparator 94 is corrected a predetermined amount established by correction dial 132 and in a predetermined direction, namely, a decrease, as determined by a comparison of the output of the melt pressure transducer 48 and the melt pressure reference potentiometer 109.

In addition to sampling the output of the melt pressure transducer for comparison against the melt pressure reference potential to determine whether the charge is to be increased or decreased the next cycle and readjusting the retraction reference potentiometer 96 to effect the necessary correction of the retraction reference potential on line 95, the trigger signal output from flip-flop 69 coincident with the ram reaching the cushion point signalling the termination of the rejection phase of the cycle is also effective via the hold timer 80 to set flip-flop 90 and energize the motor 28 and the back pressure solenoid 55S which applies 50 psi back pressure to the ram. With screw motor 28 and back pressure solenoid 55S energized, plasticization of material for the next charge begins. As plasticization continues, plasticized material for the next charge accumulates forward of the ram tip 29 with the result that the ram 29 is urged rearwardly. When the ram tip 29 reaches the retraction point established by the corrected retraction reference potentiometer 96, a signal is produced by retraction point comparator 94 which resets flip-flop 90 to de-energize screw motor 28 and back pressure solenoid 55S. Additionally, the retraction point comparator output on line 92 resets the flip-flop 69 readying this flip-flop for the next cycle, as well as strobes the pull-back comparator 100 which energizes the pull-back solenoid 60S to apply pull-back hydraulic pressure to further retract the ram until the desired amount of pull-back has been achieved, whereupon the ram position transducer input on line 71 and the pull-back reference potential on input line 101 to pull-back comparator 100 are equal, terminating the output on line 62 which in turn de-energizes the pull-back solenoid 60S to include the pull-back of the ram.

With the desired charge accumulated forward of the ram tip 29 and the "pull-back" phase complete, the control system goes into a standby condition until the cooling timer 140, which was started when the ram position reached the cushion point at the end of the preceding injection, has timed out. When the cooling timer 140 has timed out, an open mold timer 145 is actuated, producing on line 12A′ a logical 1 signal to the mold open actuator 12A which opens the molded part. The mold remains open until the open mold timer times out, whereupon the mold elements 25 and 26 are closed and the limit switch 12C tripped. When the limit switch 12C is tripped, a logical 1 signal is output on line 12C′ to set flip-flop 78 which, in the manner previously described, starts the injection cycle once again by energizing boost pressure solenoid 41S which results in the application of 2,000 psi boost pressure to the ram to effect injection.

Figure 3:
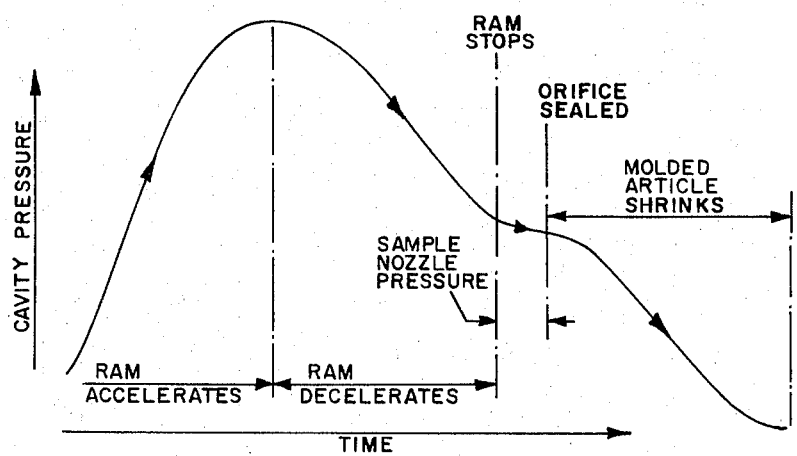
FIG. 3 is a plot of the pressure in molding cavity versus time for the injection, melt pressure sampling and cooling phases of a cycle of the apparatus depicted in FIGS. 1 and 2.

FIG. 3 depicts a plot of the pressure in the molding cavity 24 versus time for the injection, melt pressure sampling, and cooling phases of an injection molding cycle. With reference to FIG. 3, it is apparent that as the ram accelerates and its position moves toward the nozzle, the pressure of the plasticized material in the barrel nozzle 22 increases to a peak, and thereafter decreases while the ram, which is still moving toward the orifice and injecting material into the cavity, decelerates. The pressure remains more or less constant for a short interval commencing when the ram motion has stopped and injection is complete and extending to the point in time when the orifice 23 is sealed by solidification of the plasticized material therein. It is preferable during this interval of zero ram velocity that he output of the pressure transducer 48 is sampled for comparison against the reference pressure supplied by potentiometer 109. During this interval following the termination of the ram motion, when the dynamic pressure component is zero, and prior to sealing of orifice 23 by solidification of plasticized material, the pressure in the barrel nozzle 22 which is sensed by the transducer 48 is substantially equal to the pressure of the plasticized material in the cavity 24 which, as noted, is correlated to the mass of the material injected into the cavity. Subsequent to sealing of the orifice 23, the pressure in the cavity 24 decreases as the molded article cools and shrinks.

Having described the invention, it is claimed:

1. In an injection molding machine having a reciprocating ram for injecting a charge of plasticized material from an injection barrel into a mold cavity via an orifice located at the downstream end of said barrel, said ram being reciprocated between a variable retracted position and a fixed forward position, a control system for said ram designed to promote uniform charging of said cavity, said control system comprising:

a signal-controlled ram drive connected in force-transmitting relationship with said ram for advancing said ram toward said orifice from said retracted position to said fixed forward position to inject plasticized material from said barrel into said cavity via said orifice, and from said forward position to said retracted position, a pressure transducer communicating with said barrel upstream of said orifice for providing a signal correlated to the pressure of plasticized material in said barrel, a position sensor responsive to the position of said ram for providing a signal correlated to the position of said ram in said barrel, control means connected to said position sensor for generating a control signal when said ram reaches said forward position, said control signal being coupled to said ram drive means for terminating said ram advancing motion when said ram reaches said forward position, ram holding means connected in force-transmitting relationship with said ram and responsive to said control signal for holding said ram in said forward position during at least a portion of the time plasticized material injected into said cavity solidifies, sample means responsive to said control signal for sampling the output signal of said pressure transducer to produce a sampled pressure signal when said ram advancement has substantially terminated at said fixed forward position and injected plastic material in said orifice has not yet solidified, whereby the sampled pressure signal is correlated to the pressure in said cavity and hence to the mass of injected material, reference signal means for providing a reference signal correlated to a predetermined barrel pressure, correction means including a comparator responsive to said sampled pressure signal and said reference signal for producing a retraction point correction signal, and means responsive to said retraction point correction signal for varying said retracted position from which said ram advances to inject plasticized material into said cavity to thereby vary the mass of the succeeding charge of injected material in a manner dependent on cavity pressure at the conclusion of injection of the preceding charge.

2. The apparatus of claim 1 wherein said control means further include:

a reference potential source for providing a reference potential correlated to said fixed forward position, and a comparator connected to said position sensor and said fixed forward position reference source for generating said control signal when said ram reaches said fixed forward position.

3. In an injection molding machine having a reciprocating ram for injecting a charge of plasticized material from an injection barrel into a mold cavity via an orifice located at the downstream end of said barrel, said ram being reciprocated between a variable retracted position and a fixed forward position, a control system for said ram designed to promote uniform charging of said cavity, said control system comprising:

hydraulic pressure means for advancing said ram, electrically responsive valve means for controlling said hydraulic pressure means, a transducer responsive to the pressure of material in said barrel upstream of said orifice, a sensor responsive to the position of said ram, means responsive to said sensor for actuating said valve means to reduce the pressure in said hydraulic pressure means and stop said ram when said ram reaches said fixed forward position, a reference signal source for providing a reference signal correlated to the pressure in said barrel which exists when said cavity has been charged with a predetermined mass of plasticized material, sample means responsive to said position sensor, said reference signal source and said transducer for comparing said reference pressure signal and said barrel pressure transducer signal when said ram has substantially stopped and the plasticized material in said orifice has not yet solidified for producing a sampled barrel pressure signal, and means responsive to said sampled barrel pressure signal provided by said sample means for controlling the retracted position of said ram during the succeeding charge injecting cycle in a manner dependent on the relationship of said barrel pressure and said reference pressure.

4. The apparatus of claim 3 wherein said sample means includes:

velocity means responsive to said position sensor for producing a velocity signal correlated to the velocity of said ram, predetermined velocity detecting means responsive to said velocity means for producing a trigger signal when said ram velocity reaches a predetermined value, means responsive to said ram position sensor for producing an injection-finished signal when said ram reaches said fixed forward position, and means responsive to said trigger signal and said injection finished signal for sampling said barrel pressure when said ram reaches said fixed forward position.

5. The apparatus of claim 4 wherein said predetermined velocity detecting means includes a reference potential source for providing a signal correlated to said predetermined velocity.

6. In an injection molding machine having a reciprocating ram for injecting a charge of plasticized material from an injection barrel into a mold cavity via an orifice located at the downstream end of said barrel, said ram being reciprocated between a variable retracted position and a fixed forward position and being rotatable to accumulate a charge forward of the tip of said ram, and a signal-responsive ram drive for reciprocating and rotating said ram, a control system for said ram drive designed to promote uniform charging of said cavity, said control system comprising:

a transducer responsive to the pressure of material in said barrel upstream of said orifice for providing a signal correlated to barrel pressure, a sensor responsive to the position of said ram for providing a ram-position signal, first reference signal generating means for establishing first and second reference signals correlated to a specified retracted position for said ram and said fixed forward position, respectively, means including a comparator responsive to said ram position signal and said first reference signal for generating a ram rotation termination signal useful when input to said ram drive for terminating rotation of said ram when said ram position signal and said first reference signal are in a predetermined relation, means including a comparator responsive to said ram position signal and said second reference signal for generating a ram advance termination signal useful when input to said ram drive for terminating advancement of said ram when said ram-position signal and said second reference signal are in a predetermined relation, second reference signal generating means for establishing a third reference signal corresponding to a barrel pressure associated with a specified desired injection charge, and means responsive to said transducer and said second reference signal means for comparing said transducer pressure signal and third reference signal when said ram advancement has substantially terminated and injected material in said orifice has not yet solidified, said comparison means being connected to said first reference signal means for modifying said first reference signal to thereby vary said retracted position from which said ram advances to inject plasticized material into said cavity, and in turn vary the mass of the succeeding charge of injected material, in a manner dependent on barrel pressure existing at the conclusion of the preceding charge injection cycle.

7. In an injection molding machine having a reciprocating ram for injecting a charge of plasticized material from an injection barrel into a mold cavity via an orifice located at the downstream end of said barrel, a control system for said ram designed to promote uniform charging of said cavity, said control system comprising:

a signal-controlled ram drive for cyclically moving said ram toward and away from said orifice between an adjustably variable retracted position and a fixed forward position to inject an adjustably variable charge of material into said cavity dependent upon said retracted position, a pressure transducer communicating with said barrel upstream of said orifice for providing a signal correlated to the pressure of plasticized material in said barrel, trigger means responsive to the movement of said ram for providing a signal when said ram has substantially terminated its movement toward said orifice, sample means responsive to said trigger means and said pressure transducer for sampling the output signal of said pressure transducer when said ram has substantially terminated its movement toward said orifice and said plastic material in said orifice has not yet solidified, whereby the sampled signal is correlated to the pressure in said cavity when said ram is substantially motionless and hence to the mass of material injected into said cavity, reference signal generating means for producing a reference signal correlated to a predetermined barrel pressure, and control means responsive to said sampled signal and said reference signal for providing a ram drive correction signal, said correction signal being input to said ram drive for adjustably varying said retracted position from which said ram advances to inject plasticized material into said cavity to thereby vary the mass of the succeeding charge of injected material in a manner dependent on cavity pressure at the conclusion of the preceding charge injection cycle.

8. The system of claim 7 wherein:
said control means includes a source of reference potential correlated to said retracted ram position, said reference potential source being selectively variable to increase or decrease said reference potential a fixed-size increment once per ram cycle, said reference potential being increased or decreased one fixed-size increment when said sampled barrel pressure is below or above, respectively, a value correlated to the desired cavity injection charge,
said trigger means includes a position transducer responsive to the position of said ram, and
wherein said control means further includes means responsive to said position transducer and said retracted ram position reference potential source for adjusting said retracted position in a fixed-size increment once per ram cycle, said adjustment being made each cycle subsequent to said ram reaching said forward position in the preceding cycle and prior to said ram reaching said retracted position the succeeding cycle.

9. The apparatus of claim 8 wherein said control means further includes
retraction means responsive to the movement of said ram for providing a retraction-completed signal when said ram has completed retraction,
correction means for alternatively increasing and decreasing said retraction reference potential in fixed-size increments,
comparison means responsive to said sampled pressure signal and said reference pressure signal for comparing said signals and providing an output correlated thereto, and
means connected to said pressure comparison means and said correction means for controlling said correction means to alternatively produce increasing and decreasing retraction reference potential corrections in dependence upon the comparison between said sampled barrel pressure and said predetermined pressure.

10. In an injection molding machine having a reciprocating ram for injecting a charge of plasticized material from an injection barrel into a mold cavity via an orifice located at the downstream end of said barrle, said ram being reciprocated between a retracted position and a forward position, a control system for said ram designed to promote uniform charging of said cavity, said control system comprising:
a signal-controlled ram drive for advancing said ram toward said orifice through an adjustable length stroke,
a pressure transducer communicating with said barrel upstream of said orifice for providing a signal correlated to the pressure of plasticized material in said barrel,
trigger means responsive to the movement of said ram for providing a signal when the ram velocity is at a predetermined level correlated to a predetermined dynamic barrel pressure,
sample means responsive to said trigger means and said pressure transducer for sampling the output signal of said pressure transducer following charge injection when the dynamic pressure of plasticized material in said barrel is at said predetermined level and said plastic material in said cavity and hence to the mass of injected material,
reference signal generating means for producing a reference signal correlated to a predetermined barrel pressure, and
control means responsive to said sampled pressure signal and said reference signal for providing a ram drive correction signal, said correction signal being input to said ram drive for varying the length of the succeeding ram stroke inversely to the magnitude of said sampled pressure to thereby vary the mass of the succeeding charge of injected material in a manner dependent on cavity pressure existing upon conclusion of the preceding charge injection cycle.

11. The system of claim 10 wherein said ram drive moves between a fixed forward position and an adjustable retracted position, and wherein said reference signal means includes a reference signal source for providing a reference signal correlated to the static barrel pressure associated with the desired mold charge, and wherein said control means includes a comparator responsive to said pressure transducer and said trigger means for comparing said sampled barrel pressure signal to said reference pressure signal when said ram velocity is at said predetermined level and in response to said comparison generates a correction signal for application to said ram drive to vary said retracted position in the succeeding cycle dependent on static pressure in said barrel and hence in said cavity at the conclusion of the preceding charge injection cycle.

12. In an injection molding machine having a rotatable ram screw for accumulating and injecting a charge of plasticized material from an injection barrel into aa mold cavity via an orifice located at the downstream end of said barrel, said ram being rotated to accumulate a charge forward of the tip thereof beteen a fixed forward position and variable retracted position and reciprocated to inject said accumulated charge into said cavity, a control system for said ram designed to promote uniform charging of said cavity, said control system comprising:
a signal-controlled ram drive for rotating said ram through an adjustable charge-accumulating distance between a fixed forward position and a variable retracted position and for subsequently advancing said ram through said distance to inject said accumulated charge into said cavity via said orifice,
a pressure transducer communicating with said barrel upstream of said orifice for providing a signal correlated to the pressure of plasticized material in said barrel,
trigger means responsive to the movement of said ram for providing a signal when the ram velocity is at a predetermined level correlated to a predetermined dynamic barrel pressure,
sample means responsive to said trigger means and said pressure transducer for sampling the output signal of said pressure transducer following charge injection when the dynamic pressure of plasticized material in said barrel at said predetermined level and said plastic material in said orifice has not yet solidified, whereby the sampled pressure signal is correlated to the pressure in said cavity and hence to the mass of injected material, reference signal generating means for generating a reference signal correlated to a predetermined barrel pressure, and control means responsive to said sampled pressure signal and said reference signal for providing a ram drive correction signal, said correction signal being input to a ram drive for varying the distance through which said ram is rotated during the charge-accumulating cycle inversely to the magnitude of the sampled pressure to thereby between the mass of the succeeding charge of injected material in a manner dependent on cavity pressure existing upon conclusion of the preceding charge injection cycle.

13. A method of charging, with a uniform mass of injected plasticized material, a molding cavity having an orifice which communicates with an injection barrel in which a ram reciprocates under control of a signal-controlled drive means between a fixed forward position and a variable retracted position, said method comprising:

generating a signal correlated to the barrel pressure with a pressure transducer connected to be responsive to barrel pressure, generating a signal correlated to the position of said ram with a position transducer responsive to ram position, generating first and second reference signals with a voltage source correlated to a selected retracted position and said fixed forward position, respectively, electrically comparing said ram position and first reference signals in a comparator and providing a retraction termination signal when said ram position and first reference signals are in a predetermined position, automatically terminating retraction of said ram and initiating ram advance under control of said retraction termination signal when said ram position signal and said first reference signal are in a predetermined relation, electrically comparing said ram position and second reference signals in a comparator and providing an advancement termination signal when said ram position signal and said second reference signals are in a predetermined relation, automatically terminating advancement of said ram under control of said advancement termination signal when said ram position signal and said second reference signal are in a predetermined relation, establishing a third reference signal with a voltage source corresponding to a barrel pressure associated with a specified desired injection charge, electrically comparing said barrel pressure signal and said third reference signal at the conclusion of charge injection when said ram advancement toward said orifice has substantially terminated and producing a correction signal in response thereto, and automatically modifying said first reference signal with said correction signal to thereby vary the position to which said ram subsequently retracts, and hence to vary the size of the succeeding charge.

14. A method of charging, with a uniform mass of injected plasticized material, a molding cavity having an orifice which communicates with an injection barrel in which a ram reciprocates through a stroke length between forward and retracted positions, said method comprising:

generating a signal correlated to the barrel pressure with a pressure transducer responsive to barrel pressure, generating a signal correlated to the desired stroke length of said ram with a variable magnitude voltage source, driving said ram through said desired stroke in response to said stroke length signal to inject a charge into said cavity via said orifice, monitoring ram movement, automatically sampling said barrel pressure signal upon conclusion of charge injection when the ram has completed said desired stroke as determined by monitoring its movement and the dynamic pressure of plasticized material in said barrel is approximately zero and said injected plastic material in said orifice has not yet solidified, whereby the sampled pressure signal is correlated to the pressure in said cavity and hence to the mass of injected material, and correcting said stroke length signal with said sampled pressure signal, the correction being made inversely to the magnitude of said sampled pressure to thereby vary the mass of the succeeding charge of injected material in a manner dependent on cavity pressure.

15. A method of charging, with a uniform mass of injected plasticized material, a molding cavity having an orifice which communicates with an injection barrel in which a rotatable ram screw rotates under control of a signal-controlled drive means to accumulate a charge forward of the tip thereof and where said ram reciprocates toward said orifice to inject said accumulated charge into said cavity, said method comprising:

generating a signal correlated to the barrel pressure with a pressure transducer connected to be responsive to barrel pressure, generating a signal correlated to the position of said ram screw with a position transducer responsive to ram position, generating first and second reference signals with a voltage source correlated to a correctible retracted position and a fixed forward position, electrically comparing ram screw position signal and said first reference signal and providing a rotation termination signal when said ram screw position signal and said first reference signal are in a predetermined relation, automatically terminating rotation of said ram screw under control of said rotation termination signal when said ram screw position signal and said first reference signal are in said predetermined relation, electrically comparing said ram screw position signal and said second reference signal and providing a ram screw reciprocation termination signal when said position signal and said second reference signal are in a predetermined relationship, automatically terminating reciprocation of said ram screw toward said orifice under control of said reciprocation termination signal when said ram screw position signal and said second reference signal are in a predetermined relation, establishing a third reference signal with a voltage source corresponding to a barrel pressure associated with a specified desired injection charge, electrically comparing said barrel pressure signal and said third reference signal at the conclusion of charge injection when said ram reciprocation toward said orifice has substantially terminated and producing a correction signal in response thereto, and automatically modifying said first reference signal with said correction signal to thereby vary the position at which said ram screw subsequently stops rotating, and hence to vary the size of the succeeding charge.

* * * * *

UNITED STATES PATENT OFFICE
CERTIFICATE OF CORRECTION

PATENT NO. : 3,860,801
DATED : January 14, 1975
INVENTOR(S) : Denes B. Hunkar

It is certified that error appears in the above-identified patent and that said Letters Patent are hereby corrected as shown below:

Column 1, line 30, change "of" to --in--.
Column 1, line 37, insert the word "not" between the words "is" and "done".
Column 1, line 45, change "194,244" to --194,224--.
Column 3, line 24, insert "albeit non-zero" between the words "velocity" and "adds".
Column 3, line 32, change "tht" to --that--.
Column 5, line 36, change "accumuated" to --accumulated--.
Column 7, line 59, change "pressurer" to --pressure--.
Column 21, line 51, change "barrle" to --barrel--.

Column 22, line 40, change "beteen" to --between--.
Column 23, line 9, change "a" to --said--.
Column 23, line 12, change "between" to --vary--.

Signed and Sealed this twenty-ninth Day of July 1975

[SEAL]

Attest:

RUTH C. MASON
Attesting Officer

C. MARSHALL DANN
Commissioner of Patents and Trademarks

UNITED STATES PATENT OFFICE
CERTIFICATE OF CORRECTION

Patent No. 3,860,801      Dated January 14, 1975

Inventor(s) Denes B. Hunkar

It is certified that error appears in the above-identified patent and that said Letters Patent are hereby corrected as shown below:

Column 22, line 4, after "material in said" insert

-- orifice has not yet solidified, whereby the sampled pressure signal is correlated to the pressure in said  --.

Signed and Sealed this

*twenty-third* Day of *September 1975*

[SEAL]

*Attest:*

RUTH C. MASON          C. MARSHALL DANN
*Attesting Officer*          *Commissioner of Patents and Trademarks*